FIG. 1

INVENTOR.
CLARENCE E. VOGEL

Nov. 13, 1956

C. E. VOGEL 2,770,428

AUTOMATIC STEERING MECHANISM

Filed Jan. 31, 1952

INVENTOR.
CLARENCE E. VOGEL
BY
George H Fisher
ATTORNEY

United States Patent Office 2,770,428
Patented Nov. 13, 1956

2,770,428

AUTOMATIC STEERING MECHANISM

Clarence E. Vogel, Minneapolis, Minn., assignor to Minneapolis-Honeywell Regulator Company, Minneapolis, Minn., a corporation of Delaware Application January 31, 1952, Serial No. 269,209

16 Claims. (Cl. 244—77)

This invention relates to improvements in flight control apparatus for dirigible craft and specifically relates, primarily, to the disconnection of the operative relationship between the servomotors and the aileron, rudder, and elevator control surfaces of such craft.

It is an object of this invention to permit operated control surfaces to self streamline themselves when the movement of their power operating means has exceeded a predetermined value and permit subsequent manual operation thereof.

It is another object of this invention to vary in accordance with airspeed the permissible extent of operation of a control surface power means before it is permitted by the air stream to align itself with the aircraft.

It is an object of this invention to operatively disconnect all servomotors from their respective control surfaces when any servomotor has displaced its control surface a distance sufficient to operate a limit switch.

It is another object of this invention to provide a plurality of limit switches for a control surface servomotor with said switches operated in sequence and said switches controlling the operative connection of all of the servos and control surfaces and with air speed responsive means for selecting which sequentially operated switch is effective.

A further object of this invention is to provide novel means for varying the operation of a servomotor intermediate its range determined by limit switches.

The above and further objects of the invention will appear hereinafter upon consideration of the following description of a preferred embodiment illustrated in the accompanying drawing. In the drawings.

In the practice of this invention each servomotor is controlled from a balanceable network. Suitable devices responsive to attitude changes of the aircraft are included in each appropriate network to stabilize the aircraft about the heading, roll and pitch axes. By means of the balanceable network arrangements, each control surface is deflected in proportion to the change in attitude of the craft which caused the unbalance of a particular network. Each servomotor includes standard limit switches and the limit switches of each motor are in series with the other servomotor limit switches in a circuit that controls the operative connection between the motors and surfaces so that all three surfaces are released from operative engagement with their servomotors whenever any servomotor operates a limit switch.

This arrangement is preferred to merely terminating servomotor operation, as in existing arrangements, when a limit switch is operated by a servomotor. If the aircraft were nosed downwardly, for example, due to the elevator servomotor operation to its limit and the pilot of the aircraft were the sole authority to disengage the elevator from its servomotor, to permit the pilot thereafter to operate the elevator manually to level the aircraft; in many instances by the time the pilot had so acted, the speed of the aircraft in the dive was too great to permit a turn having a radius equal to the altitude of the aircraft from being executed manually to bring the craft to level position, with disastrous consequences. By automatically disconnecting the surface and servomotor when the motor runs to its limit, the surface is permitted immediately to streamline itself. Manual operation of the released control surfaces to level the craft may then be undertaken.

These standard limit switches are arranged to be operated only when maximum extent of surface deflection has occurred. This maximum surface deflection is not generally obtained in ordinary operation. It is known that the turning moment of a deflected surface increases as the square of the airspeed. To prevent a deflected surface from overstressing the craft, additional limit switches in the circuit in accordance with this invention are rendered selectively effective to disconnect the servomotors and their control surfaces when a smaller surface deflection than the maximum allowed has been applied by its servomotor. This selection in effectiveness of the additional limit switches for control surface displacements is controlled by an airspeed responsive device.

Figure 1:
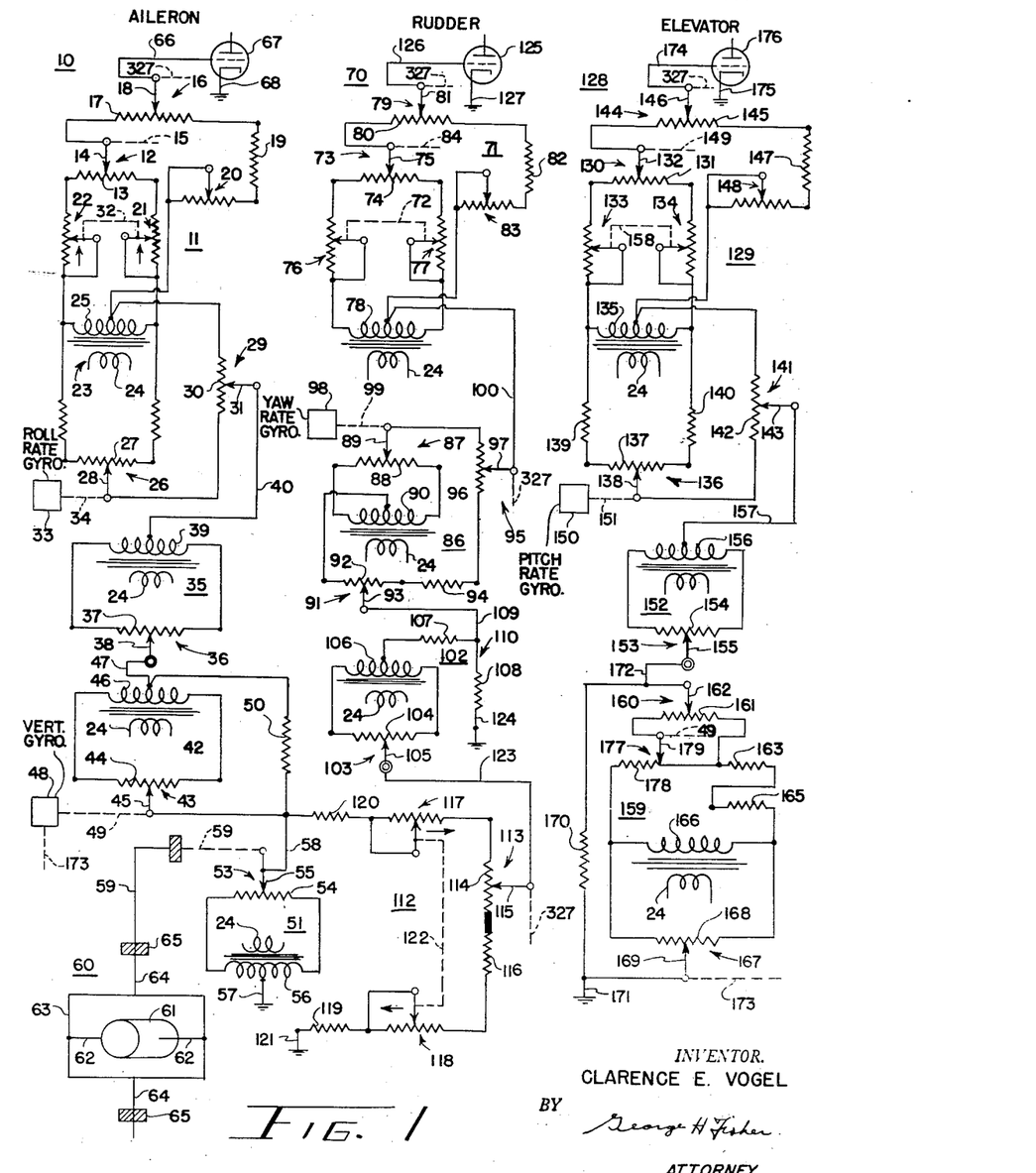
Figure 1 is a schematic layout of an arrangement for controlling an aileron, rudder, and elevator servomotor.

Referring now to Figure 1, there is illustrated the three channels of a control system having an aileron network 10, a rudder network 70, and an elevator network 128. Each network is of the balanceable voltage type, and controls a separate servomotor to effect appropriate operation of its associated control surface. The aileron network 10 comprises a servo follow up—aircraft roll rate sub network 11, a heading trim sub network 35, a roll attitude sub network 42, and a heading control sub network 51.

Sub network 11 comprises a servo balance potentiometer 12 having a resistor 13 and a slider 14; an airspeed ratio potentiometer 16 having a resistor 17 and slider 18; a fixed resistor 19; a ratio range variable resistor 20; two adjustable ratio resistors 21, 22; a transformer 23 having a primary winding 24 and secondary winding 25; a roll rate gyro potentiometer 26 having a resistor 27 and slider 28; and a roll rate ratio potentiometer 29 having a resistor 30 and slider 31. The servo balance potentiometer resistor 13 has one end connected in series with resistor 21 to one end of secondary winding 25 and has its opposite end connected through resistor 22 to the remaining end of secondary winding 25. The ratio adjusting resistors 21, 22 are jointly operated from a single controller (not shown) so that the resistance of resistors 21 and 22 are increased or decreased together as indicated by the arrows adjacent the resistors. Slider 14 is positioned along resistor 13 in accordance with the movements of the aileron servomotor by operating means 15.

Resistor 17 of the airspeed ratio potentiometer 16 has one end connected to slider 14 and the opposite end of the resistor is connected in series with fixed resistor 19 and ratio range adjustable resistor 20 to a center tap of secondary winding 25.

Resistor 27 of the roll gyro potentiometer 26 is connected across the secondary winding 25. Resistor 30 of the roll rate ratio potentiometer 29 is connected across the center tap of secondary winding 25 and slider 28. Slider 28 is positioned along resistor 27 of the roll rate gyro potentiometer 26 by a roll rate gyroscope 33 to a suitable operating connection 34. Roll rate gyroscope 33 is of the type whose rotor has two axes of rotation one being the spin axis of the rotor and the other being a precession axis at right angles to the spin axis. Restraining means are provided to resist rotation about the precession axis and the gyroscope is so arranged on the aircraft that as the craft rolls the gyro will move about its precession axis which is resisted by the restraining means so that slider 28 moves relative to resistor 27 in proportion to the rate of roll of the aircraft.

Sub network 35 comprises a manually operable trim potentiometer 36 having a resistor 37 and slider 38 with the resistor 37 connected across secondary winding 39 of the transformer. In the present arrangement, a single primary winding of the transformer is utilized to energize a plurality of secondary windings which are separately indicated in the various networks. Slider 38 is manually adjusted in either direction from the center of resistor 37. A conductor 40 connects a center tap of secondary winding 39 to slider 31 of voltage dividing potentiometer 29.

Sub network 42 comprises a roll attitude potentiometer 43 comprising a resistor 44 and a slider 45. Resistor 44 is connected across a secondary winding 46 of the transformer. A conductor 47 extends from a center tap of secondary winding 46 to slider 38. Slider 45 is adjusted relative to resistor 44 in either direction from the center thereof from a vertical gyroscope 48 through a suitable operating connection 49. The gyroscope 48 is of a conventional type whose rotor is maintained with the spin axis perpendicular to the surface of the earth. The rotor is supported in a casing which in turn is carried in an inner and outer gimbal ring so that the casing is rotatable about two respectively horizontal axes. As the craft rolls, slider 45 is moved relative to resistor 44 proportional to the magnitude and direction of the bank of the aircraft. A loading resistor 50 is connected across the center tap of secondary winding 46 and slider 45.

Sub network 51 comprises a heading control potentiometer 53 having a resistor 54 and slider 55. Resistor 54 is connected across a secondary winding 56 of the transformer. A conductor 58 extends from slider 55 to slider 45 and a ground conductor 57 is connected to a center tap of secondary winding 56. Slider 55 is adjusted in either direction from the electrical center of resistor 54 by a suitable operating connection 59 extending from a heading responsive device 60. In the present illustration of the invention the heading responsive device comprises a directional gyroscope having a rotor (not shown) supported in a casing 61 for rotation about a horizontal spin axis. Trunnions 62, 62 extend from the casing 61 at right angles to the rotor spin axis and are carried in an outer gimbal ring 63. Gimbal ring 63 in turn has trunnion 64, 64 parallel to the vertical axis of the aircraft. These trunnions are carried in bearing 65, 65. The upper trunnion is connected to the operating means 59 to slider 55. Suitable means not necessary to an understanding of the present invention are provided in the headig responsive means 60 to rotate the rotor of the gyroscope and to maintain it in a given angular relationship relative to the plane of the outer gimbal ring 63. The network 10 has output terminals represented by slider 18 and ground conductor 57. Electrical signals generated in network 10 and existing across the output terminals are applied to an electronic amplifier 67 by means of a conductor 66 extending from slider 18 to one control electrode of the amplifier and by a ground conductor 68 of the amplifier 67 connected to the other control electrode. The conductor 68 has a ground common with conductor 57 of the network 10.

Rudder network 70 comprises a follow up sub network 71, a heading rate network 86, a manually operable trim network 102, and a heading control sub network 112. Sub network 71 comprises a servo balance potentiometer 73 having a resistor 74 and a slider 75; two equal adjustable resistors 76, 77; a secondary winding 78 of the transformer; an airspeed ratio potentiometer 79 having a resistor 80 and slider 81; a fixed resistor 82; and an adjustable resistor 83. One end of resistor 74 is connected in series with one adjustable resistor 76 to one end of secondary winding 78 and the opposite end of resistor 74 is connected in series with adjustable resistor 77 to the remaining end of secondary winding 78. Slider 75 is positioned in either direction from the center of resistor 74 by an operating connection 84 from the rudder servomotor. Resistors 80, 82 and variable resistor 83 are connected in end to end relation with the fixed resistor 82 in intermediate position. The remaining end of resistor 80 is connected to slider 75 and the remaining end of adjustable resistor 83 is connected to a center tap of secondary winding 78.

Sub network 86 comprises a heading rate potentiometer 87 having a resistor 88 and slider 89; a voltage dividing potentiometer 91 having a resistor 92 and slider 93; a secondary winding 90 of the transformer; a fixed resistor 94; and an airspeed ratio potentiometer 95 having a resistor 96 and slider 97. Resistor 88 is connected across the secondary winding 90. Resistors 96, 94, and 92 are connected in end to end relation with resistor 94 between resistors 92 and 96. The remaining end of resistor 92 is connected to a center tap of secondary 90 and the remaining end of resistor 96 is connected to slider 89. A conductor 100 extends from slider 97 of the ratio rate adjusting potentiometer 95 to the center tap of secondary winding 78 of network 71. Slider 89 is positioned along resistor 88 in either direction from the center thereof by a heading rate responsive gyroscope 98 through a suitable operating means 99. The heading rate gyroscope 98 is similar to the roll rate gyroscope 33 except that it is so mounted on the aircraft that upon change in heading of the craft due to rotation about its vertical axis, the slider 89 is moved relative to resistor 88 in a direction depending upon the direction of yaw and a magnitude depending upon the rate of change of heading or rate of change of yaw.

Sub network 102 comprises a manually operable trim potentiometer 103 having a resistor 104 and a slider 105. Resistor 104 is connected across a secondary winding 106 of the transformer. Slider 105 is manually adjusted along resistor 104.

Sub network 112 comprises an airspeed responsive rudder gain potentiometer 113 having resistors 114 and 116 and a slider 115; a rudder gain adjustment comprising two variable resistors 117, 118; a fixed resistor 119; and a fixed resistor 120. The resistors 114 and 116 are connected in series so that slider 115 may engage either. Resistors 120, 117, 114, 116, 118 and 119 are connected in end to end relation in the order listed. The remaining end of resistor 120 is connected to conductor 58 and the remaining end of resistor 119 is connected to ground by conductor 121. Adjustable resistors 117, 118 are jointly operated by a suitable operating means 122 which effects the simultaneous increase and decrease or decrease and increase of adjustable resistors 117, 118 as indicated by the arrows adjacent the adjustable resistor sliders. A conductor 123 extends from slider 115 to slider 105 of trim potentiometer 103. A fixed voltage divider 110 is connected across the series connected sub networks 112, 102. Voltage divider 110 consists of two fixed resistors 107, 108 connected in end to end relation. The remaining end of resistor 107 is connected to the center tap of secondary winding 106 and the remaining end of resistor 108 is connected to ground. A conductor 109 extends from the junction of resistors 107, 108 to slider 93 of potentiometer 91. The slider 81 and the grounded end 124 of resistor 108 are the output terminals of network 70. Voltages derived in network 70 are applied to an electronic amplifier 125 by a conductor 126 connected between an amplifier control electrode and slider 81 and an amplifier electrode ground conductor 127 which has a connection from the other amplifier control electrode effected by amplifier ground conductor 127 to the grounded end of resistor 108.

Elevator network 128 comprises an elevator servo position—pitch rate sub network 129; a trim network 152;

and a bank attitude up elevator—pitch attitude sub network 159. Sub network 129 comprises an elevator servo balance potentiometer 130 having a resistor 131 and slider 132; two equal adjustable resistors 133, 134; a secondary winding 135 of the transformer; a pitch rate potentiometer 136 having a resistor 137 and slider 138; two fixed resistors 139, 140; an airspeed ratio potentiometer 144 having a resistor 145 and slider 146; a fixed resistor 147; and an adjustable resistor 148. Resistors 131, 133 and 134 are connected in end to end relation with resistor 131 in intermediate position. The remaining end of resistor 133 is connected to one end of secondary winding 135 and the remaining end of resistor 134 is connected to the opposite end of secondary winding 135. Slider 132 is adjusted in either direction from a midpoint of resistor 131 by a follow up connection 149 from the elevator servomotor. Resistors 133, 134 are simultaneously increased or decreased by a suitable operating means 158. The resistors 133, 134 comprise a manual adjustable ratio device in the sub network 129. Resistors 145, 147, 148 are connected in series in the order stated and the remaining end of resistor 145 is connected to slider 132 and the remaining end of resistor 148 is connected to a center tap of secondary winding 135. Resistors 139, 137, and 140 are connected in series in the order stated. The remaining end of resistor 139 is connected through the junction of secondary winding 135 and adjustable resistor 133. The remaining end of resistor 140 is connected to the junction of secondary winding 135 and adjustable resistor 134. Resistor 142 of the potentiometer 141 is connected across the center tap of secondary winding 135 and slider 138. Slider 138 is moved relative to resistor 137 in either direction from the midpoint thereof by a pitch rate gyroscope 150 through a suitable operating means 151. The pitch rate gyroscope 150 is similar to the roll rate gyroscope 33 and is so mounted on the aircraft that upon movement of the craft about its lateral axis slider 138 is displaced relative to resistor 137 in a direction depending upon the change in pitch attitude and an extent dependng upon the rate of change of pitch attitude.

Sub network 152 comprises a trim potentiometer 153 having a resistor 154 and slider 155 with the resistor 154 connected across a secondary winding 156 of the transformer. Slider 155 may be manually adjusted relative to resistor 154. A conductor 157 extends from a center tap of secondary winding 156 to slider 143 in sub network 129.

Sub network 159 comprises an up elevator potentiometer 177 having a resistor 178 and slider 179; an up elevator adjustment potentiometer 160 having a resistor 161 and slider 162; two fixed resistors 163, 165; a secondary winding 166 of the transformer; a pitch attitude potentiometer 167 having a resistor 168 and slider 169; and a fixed loading resistor 170. Resistors 178, 163, and 165 are connected in series relation in the order stated and the remaining end of resistor 177 is connected to one end of secondary winding 166 and the remaining end of resistor 165 is connected to the opposite end of secondary winding 166. Slider 179 is positioned along resistor 178 in proportion to the magnitude of the bank angle of the aircraft through the operating means 49 extending from the vertical gyroscope 48. The interconnection between operating means 49 and slider 179 is such that slider 179 is positioned in the same direction along resistor 178 irrespective of the direction of bank of the aircraft. For this reason, slider 179 is initially positioned at one end of resistor 178 as shown. Resistor 161 is connected across slider 179 and the junction of resistors 178 and 163. Resistor 168 is connected across the ends of secondary winding 166. Slider 169 is positioned relative to resistor 168 in either direction from the midpoint thereof in accordance with the direction and magnitude of change of pitch attitude of the aircraft. The movement of slider 169 is effected by a suitable operating means 173 extending from the vertical gyroscope 48 so that slider 169 is moved in accordance with the magnitude and direction of change in pitch attitude. Resistor 170 is connected across slider 162 and slider 169. The junction of resistor 170 and slider 169 has extending therefrom a ground conductor 171. A conductor 172 extends from slider 162 to slider 155 of sub network 152. A slider 146 of sub network 129 and conductor 171 of sub network 159 comprise the output terminals of the elevator network 128. Electrical signals in the network 128 are applied to an electronic amplifier 176 by a conductor 174 extending from slider 146 to one control electrode of the amplifier and by a conductor 175 extending from the other control electrode of the amplifier to ground and thence to ground conductor 171.

Figure 2:
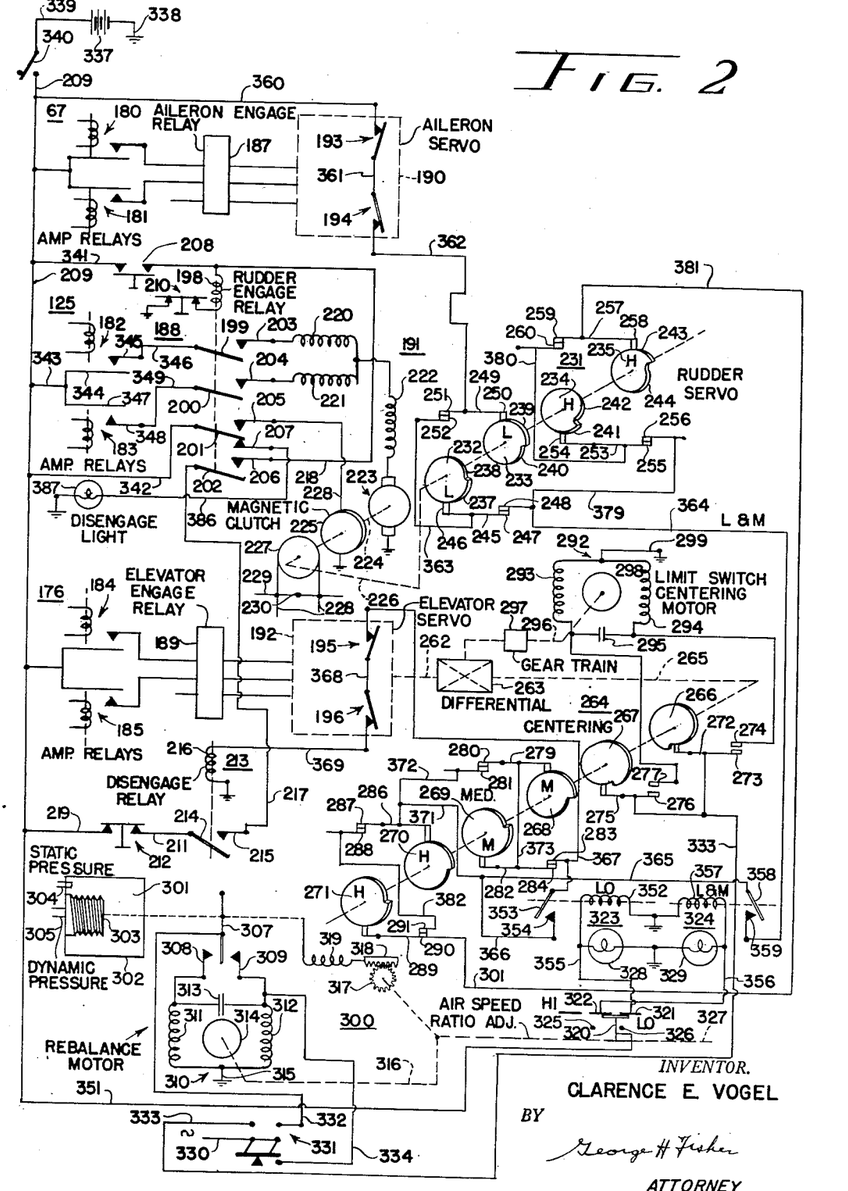
Figure 2 is a diagram of the servomotors and the novel connecting means for operatively engaging the control surfaces and servomotors.

As has been described in conjunction with Figure 1, the three balanceable electrical networks 10, 70 and 128 respectively control the aileron, rudder and elevator servomotors. In Figure 2 there is shown the details of the rudder servomotor with only general details of the aileron and elevator servomotors necessary to an understanding of the present invention. Associated with the three servomotors is an airspeed responsive arrangement for varying in accordance with airspeed the permissible extent of servomotor rotation before disengagement of the servomotors and control surfaces occur.

The servomotors are of the reversible D. C. type. Since control signals are derived from the alternating current networks described the alternating control signals from the networks are applied to an A. C. discriminator amplifier which through a pair of alternatively operable relays therein serves to connect a servomotor with the source of direct voltage before its operation. Referring to Figure 2, the relay portions of amplifiers 67, 125, and 176 are shown. Amplifier 67 includes alternatively operable single pole single make relays 180, 181; amplifier 125 includes alternatively operable single pole single make relays 182, 183; and elevator amplifier 176 includes alternatively operable single pole single make relays 184, 185. In these amplifiers, one or the other of the alternatively operable relays is energized depending upon the phase relationship of the alternating voltage derived from a control network and applied between the control electrodes of the amplifier and the voltage from the supply connected as a source of power to the amplifiers. The amplifiers thus may be of the type disclosed in Patent 2,425,734 to Willis H. Gille et al. Amplifier 67 through an aileron engage relay 187 controls an aileron servomotor 190; rudder amplifier through a rudder engage relay 188 controls a rudder servomotor 191; and elevator amplifier 176 through an elevator engage relay 189 controls an elevator servomotor 192. Aileron servomotor 190 as its rotation exceeds a predetermined amount in either direction operates alternatively single throw single break limit switches 193, 194 and elevator servomotor 192 in its rotation in either direction from a normal position operates alternatively single throw single break limit switches 195, 196. The rudder servomotor differs from the aileron and elevator servomotors since it is provided with four limit switches to be described. The details of the aileron engage relay 187, the elevator engage relay 189 as well as the aileron servomotor 190 and elevator servomotor 192 will readily appear from a detailed description of the rudder engage relay 188 and the rudder servomotor 191 which are similar to the flight elements in the aileron and elevator channels.

Rudder engage relay 188 is of the four pole double throw single break single make type having a winding 198 for operating arms 199, 200, 201 and 202. These arms coact respectively with make or in contacts 203, 204, 205 and 206. Additionally, arm 201 coacts with a break or out contact 207. Coil 198 is energized through a normally open momentarily closed manually operable switch 208 having one side connected to main buss 209 and its opposite side connected to one end of winding 198. The circuit to coil 198 is broken by a normally closed momentarily opened manually operable switch 210 having one side connected to the remaining end of winding 198 and its opposite side connected to ground. A holding circuit for engage relay winding 198 is provided by a normally closed momentarily opened manually operable disconnect switch 212, a single throw single make disengage relay 213, and arm 202 and in contact 206 of engage relay 198. One side of switch 212 is connected by conductor 219 to main buss 209. A conductor 211 extends from the opposite side of switch 212 to arm 214 of relay 213. A conductor 217 extends from make contact 215 of relay 213 to arm 202 of relay 188. A conductor 218 extends from in contact 206 through the junction of winding 198 and switch 208. The disengage relay 213 includes an operating winding 216. The energization of winding 216 is controlled by an airspeed control limit switch arrangement to be described more fully.

Rudder servomotor 191 comprises alternatively energizable field windings 220, 221, a pulsing clutch winding 222, and armature 223. The pulsing clutch winding 222 and armature 223 are connected in end to end relation and the opposite side of armature 223 is connected to ground. The opposite end of pulsing clutch winding 222 is connected to a common junction for one end of each of windings 220, 221. The opposite end of winding 220 is connected to relay in contact 203 and the opposite end of winding 221 is connected to relay in contact 204. Servomotor 191 has a drive shaft 224 which is coupled to an output shaft 226 by a magnetic clutch 225 of the type broadly disclosed in Patent 2,523,327 dated September 26, 1950. One side of clutch 225 is connected to ground and the opposite side has a conductor extending therefrom to in contact 205 of relay 188. Output shaft 226 supports a cable drum 227 from which extend operating cables 228 for the rudder (not shown). Operably connected with the cables 228 is a conventional manually operable rudder bar 229 pivoted at 230. Thus operation of the cables 228 from the output shaft 226 is also reflected in the movement of the rudder bar 229. Output shaft 226 of servomotor 191 also operates a rudder servomotor high airspeed and low airspeed limit switch arrangement 231. This arrangement includes switch operating cams 232, 233, 234, and 235 all mounted on the output shaft 226. Cam 232 has a high peripheral portion 237 and a low peripheral portion 238, cam 233 has a high peripheral portion 239 and a low peripheral portion 240. Cam 234 has a high peripheral portion 241 and a low peripheral portion 242 and cam 235 has a high peripheral portion 243 and a low peripheral portion 244. Engaging with the peripheral surface of cam 232 is a cam follower 246 supported by two arm lever 245. The opposite end of lever 245 carries a switch contact 247 engageable with its superimposed contact 248. The peripheral portion of cam 233 is engaged by a cam follower 250 on one end of a two arm lever 249. The opposite end of lever 249 carries a switch contact 251 which coacts with a fixed contact 252. The peripheral portion of cam 234 is engaged by a cam follower 254 on one end of a two arm lever 253 whose opposite end carries a contact 255 engageable with a fixed contact 256. The peripheral portion of cam 235 is engaged by a cam follower 258 on a two arm lever 257. The opposite end of lever 257 carries a contact 259 engageable with fixed contact 260. In the normal position of the servomotor, the contacts on the two arm levers engage with their respective fixed contacts. The high peripheral portions of cams 232 and 233 extends an equal angular amount but are reversely arranged so that when the shaft 226 rotates a given angular amount in one direction for example follower 246 will move inwardly to engage the lower peripheral portion of the cam. Similarly when the output shaft 226 reversely rotates from its normal position the follower 250 will move inwardly to engage the low portion 240 of cam 233 thereby separating switch contacts 251, 252. The high peripheral portions of cams 234 and 235 likewise extend an equal angular distance but are reversely positioned. The high peripheral portions of cams 234 and 235 have a smaller angular extent than the high peripheral portions of cams 232 and 233. Thus when the servomotor output shaft 226 rotates from its normal position shown the follower 254 would engage its low peripheral portion 242 before the follower 246 would engage the low peripheral portion 238 of cam 232. Likewise follower 258 when the servomotor output shaft rotates in a reverse direction from its normal position would engage the low peripheral portion 244 prior to the engagement of follower 250 with the low peripheral portion 240 of cam 233. When the followers engage the low peripheral portions of their respective cams the switch contacts associated with the arms carrying the followers are separated.

The elevator servomotor 192 in addition to its limit switches 195, 196 has its output shaft 262 operatively coupled through a mechanical differential 263 to a further limit switch arrangement 264. Extending from the mechanical differential 263 is an operating shaft 265 which carries six plate cams 266, 267, 268, 269, 270 and 271. Cams 266, 267 form one pair, cams 268, 269 form a second pair, and cams 270, 271 form a third pair. All of the cams have low and high peripheral portions. Coacting with cam 266 is a cam follower lever 272 bearing at its free end 273 a contact engageable with a fixed contact 274. Coacting with cam 267 is a two arm cam follower supporting lever 275 supporting at its free end a contact 276 which is engageable with a fixed switch contact 277. Coacting with cam 268 is a two arm, cam follower supporting lever 279 supporting at its free end a switch contact 280 normally engaged with a fixed contact 281. Coacting with cam 269 is a two arm cam follower supporting lever 282 having at its free end a switch contact 284 normally engaged with a fixed contact 283. Coacting with cam 270 is a two arm cam follower supporting lever 286 having at its free end a switch contact 288 normally engaged with a fixed switch contact 288. Coacting with cam 271 is a two arm cam follower supporting lever 289 supporting at its free end a switch contact 290 normally engaged with a fixed contact 291. In the normal position as shown, the switch contacts of the follower arms for the second and third sets of cams are engaged with their respective fixed contacts whereas the follower lever contacts for the first set of cams are separated from their opposed fixed contacts.

If the elevator servomotor and thus the elevator control surface is permanently displaced from its normal position to compensate for any out of trim condition of the aircraft so that the craft may be maintained in level flight position, it is apparent that shaft 265 without some compensating arrangement would if angularly displaced additionally from its displaced position cause, for example, the follower lever 289 associated with cam 271 to disengage contacts 290, 291 for a different angular rotation of shaft 265 than would be required for the follower lever 286 to disengage its contact 287 from its opposed contact 288. The first set of cams 266, 267 and their associated switches are utilized to control a centering motor 292 for maintaining the cams symmetrical with respect to their followers so that equal rotation of the servomotor in either direction is required before follower levers 286 and 289 operate their respective contacts 287 and 290. The cams 266 and 267 are so related to their followers that very little angular rotation in either direction of shaft 265 will cause movement of the follower levers 272, 275. The contacts on the levers 272 and 278 are only slightly displaced in normal position from their opposing fixed contacts. The exaggerated spacing of the contacts is to facilitate execution of the drawing.

The motor 292 may be a capacitor type induction motor having two field windings 293, 294. The windings are connected together at one end and a conductor 299 extends from this junction to ground. The opposite ends of the windings are connected together through a capacitor 295. The rotor 298 of the motor operates a shaft 296 which drives into a high reduction gear train 297. The gear train is of the step-down type and its output shaft is connected to drive into the mechanical differential 263. In normal operation of the elevator, it is displaced for equal intervals above and below its normal position and while output shaft 265 through its cams 266 and 267 would ordinarily cause their respective follower levers 272 and 275 to rotate and engage contact 273 with contact 274 and engage contact 276 with contact 277 the duration of closing of either sets of switch contacts is not sufficiently long to cause the motor 292 through its step-down gearing 297 to alter the position of shaft 265 appreciably during a transient disturbance. However, when the elevator is displaced permanently from its normal position one or the other of the follower levers 272 or 275 will have its contact engaged with its fixed contact continuously consequently the motor 292 is energized solely in one direction. The energization of 292 and its consequent rotation is applied through the gear train 297 to the differential to reposition the shaft 265 until the actuated follower lever is permitted to disengage its contact with its associated fixed contact. Thus the cams on shaft 265 are maintained in their normal position despite permanent displacement of the elevator control surface.

The aileron servomotor 190 has one set of limit switches comprising switches 193, 194. The rudder servomotor 191 has two sets of limit switches, that is, a set of high airspeed limit switches associated with cams 234, 235 and low airspeed limit switches associated with cams 233, 232. The elevator servomotor on the other hand has three sets of limit switches, one set consisting of conventional or low airspeed switches 195, 196, a second set termed the medium airspeed limit switches associated with cams 268 and 269, and a third set termed the high airspeed limit switches associated with cams 270, 271.

Since the cam operated limit switches are operated solely in response to servomotor rotation and since it would therefore appear that the high airspeed limit switches would always be controlling, the limit switches are further associated with an airspeed responsive arrangement 300 which selects in accordance with airspeed which set of limit switches will be effective when operated.

The airspeed arrangement 300 comprises an airspeed sensing device 301, consisting of a casing 302 which houses a bellows 303. The bellows is secured at one end to a side of casing 302. Static pressure of the atmosphere is supplied through a passage 304 in casing 302 to the exterior of bellows 303 whereas dynamic pressure of the atmosphere due to the movement of the aircraft is supplied through a passage 305 in casing 302 to the interior of bellows 303. The expansion or contraction of the bellows 303 is applied to a contactor 307 normally midway between two opposed contacts 308, 309. The contactor 307 and contacts 308, 309 control the operation of an instrument rebalance motor 310. The motor 310 is of the capacitor type induction motor having field windings 311, 312 connected directly together at one end and connected together by means of a capacitor 313 at the opposing ends. The direct connected ends of the motor windings have a conductor 315 extending from their junction to ground. The junction of the winding 311 and capacitor 313 is connected to contact 308 and the junction of winding 312 and capacitor 313 is connected to contact 309. The rotation of rotor 314 of the induction motor 310 is transmitted by output shaft 316 to a follow up arrangement consisting of a pinion 317 on shaft 316 operating a longitudinally movable rack bar 318. The rack bar 318 returns the contactor 307 to intermediate position through a resilient operating connection 319 which may consist of a spring. The rotation of shaft 316 is also applied to a second contactor 320 which in normal position coacts simultaneously with a low airspeed contact 321 and a high airspeed contact 322. Stops 325, 326 are placed on opposite sides of the contactor 320 to limit its displacement. Associated with low airspeed contact 321 is a low airspeed relay 323 of the single throw single make type. Associated with contact 322 is a medium airspeed relay 324 of the single throw single make type. Also associated with contacts 321 and 322 respectively are indicator lights 328, 329.

Reverting to Figure 1, the balanceable networks are also associated with the airspeed responsive device 300 in that rotation of output shaft 316 of the balance motor 310 is transmitted by operating means 327 to sliders 18, 81, and 146 of the airspeed ratio potentiometers for the aileron, rudder and elevator networks respectively. Operating means 327 also adjusts slider 97 of the airspeed ratio potentiometer across the yaw rate gyroscope network and additionally the operating means 327 adjusts the slider 115 of the proportional range adjustment.

Alternating voltage for operating the capacitor type induction motors 310, 292 is led by conductor 330, Figure 2 from the supply to both operable arms of a double pole double throw switch 231. In one operated position of the switch the voltage is fed from one switch arm by means of conductor 332 to the contactor 307 positioned by the airspeed responsive device 301 which controls the motor 310. Additionally, a conductor 333 in this operated position connects the remaining switch arm with contacts 273, 276 associated with cam follower arms 272, 275 for controlling the operation of the centering motor 292. In the other position of the double pole double throw switch 331 a conductor 334 connects one switch arm with the junction of condenser 313 and motor field winding 312 of motor 310 to cause it to rotate in one direction. This operated position of the double throw switch 331 controls a test circuit whereby the motor 310 is effective to move the contactor 320 in the direction of high airspeed operation of the motor so that operation of the airspeed arrangements may be checked on the ground from the indications of lights 328, 329. During this operation of the contactor 320 the follow up drive moves contactor 307 into engagement with contact 308. This engagement is effective when the two position switch 331 is again moved to the opposite position to cause the rebalance motor 310 to reverse its rotation and return to its normal position.

D. C. voltage for energizing the servomotors and operating the various relays referred to is obtained from a source such as a battery 337 which has one side connected by conductor 338 to ground and its other side connected by conductor 339 and normally open single pole single throw switch 340 to main buss 209.

*Operation*

With the aircraft airborne and being manually controlled, the single pole single throw switch 340 may be closed to energize main buss 209 from battery 337. The transformer that energizes the secondary windings of the transformer may be simultaneously connected to the alternating current power source. The double pole double throw switch 331 may be placed in the operated position wherein conductors 332 and 333 are energized from the alternating current source. With the aircraft in the attitude desired for the application of automatic control, the manually operable sliders 38, 105, and 155 of the aileron, rudder, and elevator networks trim potentiometers may be adjusted until their respective networks are in balance condition.

With the networks balanced, conditions are established for the application of automatic control. Automatic control is applied by closing switch 208 (Figure 2) whereby current is led from energized buss 209, conductor 341, switch 208, operating winding 198 of rudder engage relay 188, disconnect switch 210 to ground and return to ground conductor 338. A switch similar to switch 208 in the rudder channel may be provided for the aileron and elevator engage relays or if desirable a common actuator for all three engage relay switches may be provided. With the relay winding 198 energized, the relay arms 199, 200, 201, 202 move to their upward position in the figure.

With the rudder engage relay arms operated, current is led from buss 209, conductor 342, relay arm 201, contact 205, conductor 228, to magnetic clutch 225, to ground, a thence to ground conductor 338 of battery 337. With the clutch 225 energized, the rudder servomotor 191 is operatively connected with the cable drum 227 and thus to the rudder control surface. With the windings of motor 191 unenergized, the pulsing clutch winding 222 is unenergized and thus the motor shaft 224 is held in a braked condition. This type of arrangement wherein a brake holds the motor shaft against rotation while the motor is unenergized is illustrated by the patent to Lear, 2,267,114. In the same manner the aileron and elevator servomotors 190 and 192 become operatively connected with their respective control surfaces upon energization of their relays 187 and 189.

Should the rudder network become unbalanced while the servomotor is operatively connected with its surface one or the other of the rudder amplifier relays 182, 183 will be energized. If relay 182 is energized, current is led from energized buss 209, conductor 343, relay arm 344, relay contact 345, conductor 346, relay arm 199, relay contact 203, motor winding 220, pulsing clutch winding 222, armature 223, to ground, and return to battery ground 338. The circuit through the servomotor 191 is thereby completed and causes it to rotate in one direction to displace the rudder. Simultaneously the output shaft 226 operates the cams carried thereon. Similarly if relay 183 is energized, current is led from energized buss 209, conductor 343, relay arm 347, relay contact 348, conductor 349, engage relay arm 200, rudder engage relay contact 204, motor winding 221, pulsing clutch winding 222, armature 223, to ground, and return to battery ground 338. The motor is energized reversely and thus rotates in the opposite direction. Similarly when the aileron or elevator networks are unbalanced which may be caused respectively by change in attitude of the aircraft about the roll and pitch axes, the aileron amplifier 67 and the elevator amplifier 176 control the aileron servomotor 190 and elevator servomotor 192 to operate the ailerons and elevators. The servomotors in each instance operate their follow up connections to the sliders of the servo balance potentiometers to maintain the networks in balance condition.

If the aircraft is flying at a low airspeed, the contactor 320 in the airspeed arrangement 300 engages both contacts 321, 322. Current is thereupon supplied from energized buss 209, conductor 351, contactor 320, contact 321, operating winding 352 of relay 323, to ground, and return to battery ground 338. Winding 352 operates arm 353 to cause its engagement with relay in contact 354. Simultaneously current is led from energized contactor 320, contact 322, conductor 356, relay winding 357, to ground and return to battery ground 338. Relay winding 357 causes relay contact arm 358 to engage in contact 359. With the operation of winding 352 indicator light 328 is energized and likewise with the energization of winding 357 indicator light 329 is energized.

With both relays 323, 324 energized, a circuit extends from energized buss 209, conductor 360, aileron servomotor limit switch 193, conductor 361, aileron servomotor limit switch 194, conductor 362, contact 251, contact 252, conductor 363, contact 247, contact 248, conductor 364, contact relay 359, relay arm 358, conductor 365, conductor 366, relay contact 354, relay arm 353, conductor 367, elevator servomotor limit switch 195, conductor 368, elevator servo limit switch 196, conductor 369, winding 216 of disengage relay 213, to ground and return to battery ground 338.

With relay 213 energized, its arm 214 engages its in contact 215. The holding circuit for the rudder engage relay winding 198 is thus completed and extends from energized buss 209, conductor 219, closed disconnect switch 212, conductor 220, relay arm 214, in contact 215, conductor 217, relay arm 202, relay in contact 206, conductor 218, rudder engage winding 198, rudder disengage switch 210, to ground and return to battery ground 338.

At low airspeeds, the rudder servomotor driven high airspeed limit switch actuating cams 234 and 235 have no control over the continuity of the circuit for energizing winding 216 of the disengage relay. Also neither limit switch actuating cams 268, 269, 270, or 271 operated by the elevator servomotor 192 controls the circuit for the winding 216 of disengage relay 213. If, at the low airspeed, the aileron servomotor operates sufficiently to open switches 193 or 194, the circuit for energizing relay winding 216 is broken, and the holding circuit for the rudder engage relay winding 198 is opened between relay arm 214 and in contact 215 of disengage relay 213. Similarly if the rudder servomotor 191 operates in one or the other direction to separate contacts 251, 252 or 247, 248 by causing followers 250 or 246 to become engaged with the low portions of the respective cams, the circuit for energizing the disengage relay winding 216 is also opened so that the rudder engage relay winding 198 is deenergized. If the elevator servomotor rotates to open either its limit switch 195, 196, the circuit for energizing winding 216 is broken and all servomotors are disengaged from their control surfaces. While the holding circuit for the rudder engage relay winding 198 alone is illustrated, a similar holding circuit for the aileron engage relay winding and the elevator engage relay winding is also provided through the disengage relay contacts 214 and 215, consequently whenever the holding circuit for the coil 216 of disengage relay winding 213 is opened all of the engage relay windings are deenergized so that their respective servomotors are operatively disassociated from their respective control surfaces.

As the airspeed increases, the bellows 303 is elongated so that contactor 307 engages contact 309. A circuit is thus completed from alternating current supply conductor 330, double pole double throw switch 331, conductor 332, contactor 307, contact 309, to motor winding 312 directly to ground and from contact 309, condenser 313 and motor winding 311 to ground and thence to alternating current supply source to ground. The motor 310 is then energized and operates through the pinion and rack bar combination 317 and 318 and resilient connection 319 to return contactor 307 to its mid position. At the same time the motor output shaft 316 moves the contactor 320 toward the left to disengage it from the low contact 321. The circuit is thereby broken for winding 352 of relay 323 but is maintained for winding 357 of relay 324. Arm 353 is then disengaged from contact 354 in relay 323.

The circuit for energizing winding 216 of disengage relay 213 now extends from energized buss 209, conductor 360, aileron servo limit switch 193, conductor 361, aileron servomotor limit switch 194, conductor 362, contacts 251, 252, conductor 363, contacts 247, 248, conductor 364, relay contact 359, relay arm 358, conductor 365, conductor 371, conductor 372, medium airspeed limit switch contacts 281, 280, conductor 373, medium airspeed limit switch contacts 284, 283, conductor 367, elevator servo limit switch 195, conductor 368, elevator servo limit switch 196, conductor 369, relay winding 216, to ground, and return to battery ground 338. It is thus evident that neither the high airspeed rudder servo limit switch contacts operated by cams 234 or 235 or the high airspeed limit switch contacts 287, 288; 290, 291; operated by cams 270, 271 from the elevator servomotor 192 control the circuit for winding 216.

As the airspeed continues to increase, the rebalance motor 310 will move the contactor 320 so that it is disengaged both from contacts 321 and 322 thus neither relay 323 or 324 will be energized so that relay contact arms 353 and 358 are disengaged from their respective contacts. The circuit for energizing disengage relay winding 216 now extends from energized buss 209, conductor 360, aileron servo limit switch 193, conductor 361, aileron servo limit switch 194, conductor 362, limit switch contacts 251, 252, conductor 363, limit switch contacts 247, 248, conductor 379, high airspeed limit switch contacts 256, 255, conductor 380, high airspeed limit switch contacts 360, 359, conductor 381, high airspeed elevator servo limit switch contacts 290, 291, conductor 382, elevator limit switch contacts 288, 287, conductor 372, medium airspeed limit switch contacts 281, 280, conductor 373, medium airspeed limit switch contacts 284, 283, conductor 367, elevator servo limit switch 195, conductor 368, limit switch 196, conductor 369, relay winding 216, to ground and return to battery ground 338. Thus rotation of the rudder servomotor 191 sufficient to cause cam followers 254 or 258 to engage the low portion of their respective cams 234 and 235 or rotation of the elevator servomotor in either direction sufficient for the follower of levers 289 or 286 to engage the low portions of cams 271 or 280 will open the circuit for the disengage relay winding to cause the disconnection of all of the servomotors from their control surfaces.

When the disengage relay 213 is deenergized and causes the deenergization of the rudder engage relay, relay arm 201 thereof drops and engages its out contact 207. A circuit is then completed from energized buss 209, conductor 342, relay arm 201, relay contact 207, conductor 386, disengage light 387 to ground and return to battery ground 238. With the light 387 energized, the pilot is notified that he may assume manual operation of the control surfaces which had been streamlined by the aerodynamic force on disengagement of the servomotors therefrom. This disengagement and aero-dynamic force on the control surface is detected by the pilot immediately not only by the operation of the disengage light 387 but also by the fact that the rudder bar is concurrently moved by the cables 228 during the streamlining of the rudder control surface.

Reverting to Figure 1 the balanceable networks 10, 70, and 128 develop voltages across their output terminals in response to movements of the sliders in various sub networks. For example, if the aileron network 10 be in balanced condition, adjustment of the slider 38 of the trim potentiometer 36 will alter its voltage relative to that of the center tap of secondary winding 39. This voltage in network 10 is applied to the two control electrodes of aileron amplifier 67. If the aileron servomotor be operatively connected to amplifier 67 through the engage relay 187 having been operated, the servomotor will be energized and through its follow up connection 15 will displace slider 14 of the rebalance potentiometer 12 until the network 10 is again in balance condition. At balance condition, the operated amplifier relay is deenergized and the servomotor ceases further movement.

This movement of follow-up slider 14 develops a voltage between it and the center tap of secondary winding 25 which is equal and opposite to the voltage between slider 38 and the center tap of secondary winding 39. This equal and opposite voltage depends upon the ratio potentiometer slider 18 being in its extreme left position and the manually adjustable resistors 21, 22 having their corresponding sliders in the extreme upward position in the figure. At this time the full voltage developed between slider 14 and the center tap of secondary winding 25 has its greatest effect in network 10 for any given movement of the slider.

With the adjustable resistors 21, 22 operated so that their sliders are at the upward position and if slider 18 be moved toward the right from its extreme left position, it is apparent that less than the full voltage developed between slider 14 and the center tap of secondary winding 25 is applied by slider 18 to the control electrode of amplifier 67. The servomotor is therefore required to adjust slider 14 an additional amount until the voltage between slider 14 and the center tap of secondary winding 25 is equal and opposite to the voltage between slider 38 and the center tap of secondary winding 39. Slider 18 is moved toward the right as airspeed decreases and is moved toward the left as airspeed increases. Thus, less aileron displacement is obtained for a given input signal in the aileron channel with increase in airspeed and greater displacement of the aileron control surface is obtained as airspeed decreases. The slider 18 as stated is adjusted automatically from the operating means 327 of the airspeed responsive device 300.

Similarly in the rudder network 70 and elevator network 128, sliders 81 and 146 are adjusted toward the left with increase in airspeed and toward the right with decrease in airspeed to vary the amount of displaced rudder and displaced elevator for a given input control signal in the network 70 and 128.

Returning to aileron network 10, a manual selective change in the amount of control surface displacement for a given input signal is provided by the two manually adjusted resistors 21, 22 in sub network 11. Again, with slider 18 at the extreme left position and the sliders of resistors 21, 22 in their uppermost position the greatest effect voltagewise from sub network 11 is obtained by displacement of slider 14 along resistor 13. If the resistors 21 and 22 be adjusted by the operating means 32 to increase simultaneously their resistance which is in series with resistor 13 of potentiometer 12 it is apparent that the voltage drop across resistor 13 decreases. With less voltage drop across resistor 13 it is apparent that a greater movement of slider 14 is required to develop a voltage between the slider and the center tap of secondary winding 25 before it offsets the voltage between slider 38 and the center tap of secondary winding 39. A greater movement of slider 14 is accompanied by a greater movement of the ailerons so that the amount of aileron displacement for a given input signal at a selected airspeed may be adjusted selectively manually by the adjustment of resistors 21, 22. Similarly in the sub networks 71 and 129, the adjustable resistors 76 and 77 and 133 and 134 respectively may be made to vary the amount of rudder and elevator displacement at a selected airspeed for a given input signal in networks 70 and 128. The manually operable ratio adjustments referred to in the sub networks 11, 71, and 129 are used primarily as a calibration means in each instance to secure the proper voltage drops across the servo balance potentiometers thereby compensating for variations in transformer losses and other electrical losses tending to change the servo balance potentiometer voltages.

In the rudder network 10 there is provided the yaw rate potentiometer 87 with its ratio potentiometer 95 whose slider 97 is automatically adjusted toward the lower position in the figure with increase in indicated airspeed of the aircraft. The rate gyro potentiometer 87 increases the directional stability of the aircraft where insufficient aerodynamic stability is provided by the conventional vertical stabilizer of the aircraft by operation of the rudder alone. The tendency of the aircraft to oscillate about its direction of heading are detected by the yaw rate gyroscope 98 to apply corrective rudder to counteract this tendency to oscillate. With increase in airspeed the directional stability of the aircraft increases so that less corrective rudder is required to compensate for these oscillations. Consequently the amount of voltage developed by the yaw rate gyro potentiometer 87 and utilized in network 70 is caused to be decreased by the positioning of slider 97 as stated in accordance with airspeed.

While the signal from the yaw rate gyroscope to prevent heading instability serves a useful function, at the same time it also developes a signal when the aircraft is making a turn of considerable extent. For example, if the craft incurs a transient disturbance tending to move it off course, the directional gyroscope 60 operates slider 55 to cause the craft under the applied ailerons and rudders to bank and turn and thus to be returned to its original heading. During the time that the craft responds to the transient disturbance and until maximum deviation from heading is reached the signal from the directional gyroscope and from the yaw rate gyroscope 98 is of the same phase. However, during the time when the aircraft is recovering from the maximum deviation due to the disturbance, the signal from the directional gyroscope 60 is of opposite phase from the signal from the rate gyroscope 98. It is therefore necessary during this recovery from the maximum deviation, when the aircraft is in a steady state part of the turn, to correct for the deviation, for the signal from the directional gyroscope 60 as determined from the potentiometer 51 be equal and opposite to the yaw rate signal from the network 86. To this end, the airspeed responsive rudder gain potentiometer 113 is applied across the network 51. The slider 115 of the rudder gain potentiometer 113 is moved in a downward direction with increase in airspeed. Thus the useful signal from the heading control potentiometer 51 which supplied into the rudder network is modified by the rudder gain potentiometer 113 so that in a steady state part of the turn there is no effective signal in the rudder network 70 and the rudder is consequently approximately streamlined.

The manually adjustable resistors 117, 118 have been provided to select the proper voltage on slider 115 derived from network 51 while maintaining the same impedance across network 51. The actual voltage selected by slider 115 for a given heading control signal from network 51 will be the appropriate value for the low airspeed of the aircraft.

In conclusion, it will now be apparent that there has been provided a novel flight control apparatus for an aircraft which effectively disconnects the servomotors of the apparatus from the control surfaces of the aircraft to permit their manual operation upon either control surface exceeding a predetermined displacement and further wherein this predetermined displacement is varied in accordance with the indicated airspeed of the aircraft. Furthermore provisions have been made in said apparatus of improved means for maintaining substantially constant the turning moment of a displaced control surface on the aircraft for a given control signal initiating such surface operation.

Having described the invention and the manner in which the same may be used, what is claimed is:

1. Apparatus for operating a control surface for controlling the attitude of an aircraft, said apparatus comprising: a motor; current responsive connecting means adapted to operatively connect said motor to said control surface; means including a balanceable network and connected to said motor for controlling said motor on unbalance of said network; means responsive to a change in attitude of said aircraft for unbalancing said network; follow up means operated by said motor for rebalancing said network to thereby terminate motor operation; an electric circuit for controlling said connecting means between said motor and surface comprising a plurality of normally closed series connected limit switches sequentially operable to open position by said motor upon increased displacement thereof from a normal position; a shunting means for each said switch for maintaining the energizing circuit despite operation of its related switch; and means responsive to the air speed of said aircraft disabling said shunting means in sequence for selecting the operated switch to effect said control.

2. Control apparatus for an aircraft having a manually operable control surface adapted also for power operation, said apparatus comprising: a motor; means including a magnetic clutch for operably connecting said motor and surface; craft tilt responsive means for initiating motor operations; motor driven follow up means for causing said motor to operate proportional to craft tilt; a plurality of normally closed series connected limit switches sequentially operated by said motor during increasing displacement thereof from a normal position and each operated switch selectively disabling an energizing circuit for the magnetic clutch of said connecting means; and airspeed responsive means for shunting a first operated switch at lower air speeds to maintain said circuit to permit further motor operation of said surface but not shunting the first operated switch at the higher air speed to terminate further displacement of said surface by said motor on operation of said first switch.

3. Control apparatus for an aircraft having aileron, elevator, and rudder control surfaces, said control surfaces being manually or motor operated, said apparatus comprising: a motor for operating each control surface; electromagnetically controlled means for operatively connecting each motor and its respective surface; adjustable means for initiating operation of each motor; motor driven follow-up means for causing each motor to operate in proportion to the adjustment of its initiating means; an individual limit switch operated by each motor each switch being in series with the other switches and controlling all of the electromagnetically controlled connecting means; whereby upon operation of a limit switch by its motor said control surfaces are exclusively manually operable.

4. Control apparatus for an aircraft having a manually or motor operable control surface, said apparatus comprising: a motor; electric current responsive means for operatively connecting said motor and surface; circuit means for controlling the current responsive means; means for initiating motor operation; motor driven follow-up means for causing termination of said motor operation; a plurality of surface operation terminating switches sequentially operated by said motor and alternatively controlling said circuit means; a motor controller comprising an operable contactor arm positioned in accordance with the airspeed of the craft; a pair of opposed contacts coacting with said contactor arm; a motor controlled by engagement of said arm with one or another of the contacts; follow-up means driven by said motor for returning said contactor arm to unengaged position; and further means in said circuit means and driven by said follow-up means for selecting the surface operation terminating switch to effect said alternative control.

5. Control apparatus for an aircraft having a manually and motor operable control surface, said apparatus comprising: a motor; switch controlled means for operatively connecting said motor and surface; means including a balanceable control network comprising craft tilt responsive means for unbalancing said network and motor driven follow-up means for rebalancing said network, said network means being connected to said motor for controlling said motor; ratio means in said network for varying the effect of said follow-up means to vary the amount of motor movement for a given craft tilt; means for adjusting said ratio means in accordance with the difference of the static and dynamic air pressure on the aircraft; a plurality of motor and surface connection disabling switches sequentially operated by said motor and alternatively controlling said connecting means; and additional means responsive to the air pressure difference on said craft and connected to said switches and connecting means for selecting which switch is to effect said alternative control whereby said motor and surface are disconnected upon operation of said switch.

6. Control apparatus for an aircraft having aileron and rudder control surfaces which may be manually or motor operated, said apparatus comprising: a motor adapted to operate said ailerons through a disconnectable clutch; a motor adapted to operate said rudder through a disconnectable clutch each clutch being switch controlled; a balanceable network for operating said aileron motor; a balanceable network for operating said rudder motor; heading determining means for unbalancing both networks to operate both motors; follow-up means driven by each motor for rebalancing its respective network; means connected to both networks and responsive to the airspeed of said aircraft for relatively varying the extent of unbalance of said aileron and rudder motor networks from said heading determining means; a switch operated by each motor; and means connected to said clutches and effective upon the operation of a switch for controlling both clutches for disconnecting both motors from their control surfaces.

7. Control apparatus for an aircraft having aileron and rudder control surfaces, said apparatus comprising: a motor adapted to operate said ailerons; a motor adapted to operate said rudder; a balanceable potentiometer network for operating said aileron motor; a balanceable potentiometer network for operating said rudder motor; a follow-up connection from each motor to its operating network; a cross connection between said balanceable potentiometer networks comprising a heading controlling potentiometer in said aileron network, a voltage divider across said potentiometer having a slider connected to said rudder network, adjustable impedance means in series with said divider across said potentiometer for maintaining the impedance constant of said voltage divider across said heading control potentiometer while varying the voltage of said voltage divider slider during an operation of said heading control potentiometer to vary the relative positions of the aileron and rudder surfaces; and means responsive to airspeed for varying the position of the slider of said voltage divider to modify in accordance with airspeed the amount of rudder motor operation relative to aileron motor operation due to operation of said heading control potentiometer.

8. Control apparatus for an aircraft having aileron and rudder control surfaces, said apparatus comprising: a motor for operating said aileron; a motor for operating said rudder; a balanceable potentiometer network for operating said aileron motor; a balanceable potentiometer network for operating said rudder motor; a follow-up connection from each motor to its operating network; a cross connection between said networks comprising a signal deriving potentiometer in said aileron network, a voltage divider across said potentiometer having a slider connected to said rudder network, and means for maintaining constant the impedance across said signal deriving potentiometer while varying the potential of said slider during operation of said potentiometer to alter the relative positions of the aileron and rudder surfaces; directional control means for operating said potentiometer for unbalancing both networks to operate both motors; and a craft condition responsive means for adjusting the slider of said voltage divider for varying the extent of unbalance of said aileron and rudder motor networks from said directional control means to vary the relative extents of operation of the aileron and rudder surface with changes in the condition.

9. Control apparatus for an aircraft having aileron and rudder control surfaces, said apparatus comprising: a motor for operating said ailerons; a motor for operating said rudder; a balanceable electrical network for operating said aileron motor; a balanceable electrical network for operating said rudder motor; a cross connection between said networks comprising an electrical signal generator in said aileron network, a voltage divider across said generator having a slider connected to said rudder network, and adjustable means for adjusting the position of the slider of said voltage divider to alter its potential to vary the rudder gain or relative extent of movements of said aileron and rudder motors; and further adjustable means in said cross connection to alter the slider potential in its assumed position for varying the rudder gain while maintaining constant the impedance of said cross connection for said signal generator, and means responsive to a change in condition of said craft for operating one of the adjustable means.

10. Control apparatus for an aircraft having a control surface for controlling the attitude of said craft about an axis, said apparatus comprising: a motor for operating said surface; means connected to said motor and including a balanceable network for controlling said motor said network including an initiating signal generator for unbalancing said network and a follow-up signal generator operated by said motor for rebalancing said network said follow-up signal generator comprising a transformer secondary winding, a potentiometer having its resistor connected across said secondary winding through series connected adjustable resistors which may be simultaneously increased or decreased to vary the potential drop across said potentiometer resistor, operating means from said motor to said potentiometer slider, a voltage dividing potentiometer comprising an adjustable tap and resistor and having its resistor connected across the potentiometer slider and a center tap of said secondary winding, and means for adjusting the slider of said voltage divider in accordance with airspeed, whereby the extent of movement of said motor with respect to the movement of said initiating signal generator adjustment is varied in accordance with airspeed and may be further modified by the adjustment of said adjustable resistors.

11. Control apparatus for an aircraft having a manually or motor operable control surface, said apparatus comprising: a reversibly operable motor; current responsive means for operatively connecting said motor and surface; craft tilt responsive means for initiating motor operation; motor driven follow-up means for causing said motor to operate proportional to craft tilt; and circuit means for controlling said connecting means including two sets of sequentially operated switches, actuating means for opening said switches driven by said motor, means slowly responsive to initial movement of the actuating means in either direction for maintaining said actuating means symmetrical with respect to both sets of sequentially operable switches the set of operated switches depending on direction of motor operation; and further means in said circuit means responsive to the airspeed of said aircraft for selecting which of the sequentially operable switches is effective to control said connecting means to disconnect the motor and surface.

12. Control apparatus for an aircraft having a manually and motor operable rudder control surface displaceable from a normal unoperated position, said apparatus comprising: a motor; switch controlled means for operatively connecting said motor and rudder; a controller of the balanceable follow-up type for controlling said motor; means for altering the balance of the controller causing change in course of said aircraft; limit switches connected in series and operated invariably in sequence by said motor during displacement of the motor from a normal position and controlling said connecting means for limiting the rudder operation independent of the balance of said controller; and circuit controlling means responsive to the airspeed of said aircraft for by-passing the first operated switch during displacement of the motor from normal position to render it ineffective on said connecting means to permit large deflections of said rudder if ordered by said controller at low airspeeds.

13. In an automatic pilot for an aircraft, a gyroscope operated follow-up rebalanceable controller, a motor adapted to operate a control surface and operated by said controller, a pair of limit switches invariably sequentially operated by said motor, circuit means including said switches for isolating said surface from the motor for limiting the operation of said surface by said motor independently of the rebalance of said controller; and means in said circuit means and operated in accordance with the airspeed of said aircraft for electrically shunting a first operable switch for rendering effective a subsequent operated switch.

14. Control apparatus for an aircraft having aileron and rudder control surfaces, said apparatus comprising: a first motor adapted to operate said ailerons; a second motor adapted to operate said rudder; means including a first balanceable voltage network controlling said first motor; means including a second balanceable voltage network controlling said second motor; a heading control voltage signal generator in said first network; a cross connection between said networks for unbalancing both networks from said heading signal generator; follow-up means driven by the two motors for rebalancing their respective networks; adjustable voltage selecting means in said cross connection and responsive to change in airspeed of said craft for varying the relative amount of rudder displacement to aileron displacement; and further means in said cross connection for altering the magnitude of the selected voltage in the adjusted position of the selecting means while maintaining the change in magnitude of selected voltage per unit of adjustment unchanged for securing the desired relative amount of rudder displacement to aileron displacement at any particular airspeed for a given heading signal without changing the effect of said airspeed responsive means to vary said relative amount of rudder and aileron displacements for changes of airspeed.

15. Control apparatus for an aircraft having aileron and rudder control surfaces, said apparatus comprising: a first motor adapted to operate said aileron; a second motor adapted to operate said rudder; means including a first balanceable voltage network controlling said first motor; means including a second balanceable voltage network controlling said second motor; a heading control signal generator; means for connecting said generator to said aileron network; coupling means between said voltage generator and said second network; adjustable means in said coupling means and responsive to change in airspeed to alter the magnitude of the voltage supplied to the second network from the heading generator for varying the relative amount of rudder displacement to aileron displacement for changes in airspeed; and further means in said coupling means for additionally changing the magnitude of the voltage supplied to the second network while maintaining unchanged the change in voltage magnitude per unit of adjustment of said adjustable means for securing the desired relative amount of rudder displacement to aileron displacement at any airspeed for a given heading signal without changing the effect of said airspeed responsive means on said relative amount for changes of airspeed.

16. Control apparatus for an aircraft having a manually or motor operable control surface, said apparatus comprising: a motor; electromagnetic means for operatively connecting said motor and said surface; a balanceable control means connected to said motor for operating said motor on unbalance thereof said control means including an initiating controller and a follow-up controller driven by said motor; a plurality of series connected switches connected to said electromagnetic means and sequentially operated to open position by said motor shunting means for said switches; an airspeed responsive means, as airspeed increases, operating said shunting means for sequentially relieving the shunting of said switches in inverse order of their operation by the motor as the motor operates from a normal position, for selecting an operated alternative controlling switch to effect the disconnection of said electromagnetic means.

References Cited in the file of this patent
UNITED STATES PATENTS

| | | |
|---|---|---|
| 1,418,335 | Sperry | June 6, 1922 |
| 2,120,950 | Hodgman | June 14, 1938 |
| 2,131,824 | Spencer | Oct. 4, 1938 |
| 2,176,817 | Jacobson et al. | Oct. 17, 1939 |
| 2,387,795 | Isserstedt | Oct. 30, 1945 |
| 2,446,681 | Wehner | Aug. 10, 1948 |
| 2,448,167 | Baak | Aug. 31, 1948 |
| 2,463,905 | Porton | Mar. 18, 1949 |
| 2,471,821 | Kutzler et al. | May 31, 1949 |
| 2,474,618 | Divoll | June 28, 1949 |
| 2,561,873 | Kutzler | July 24, 1951 |
| 2,570,905 | Young et al. | Oct. 9, 1951 |